(12) United States Patent
Bates et al.

(10) Patent No.: US 7,107,063 B1
(45) Date of Patent: Sep. 12, 2006

(54) SELECTIVE DISPLAY OF DISPLAY INFORMATION PACKETS IN A PACKET-BASED COMMUNICATION MEDIUM

(75) Inventors: Cary Lee Bates, Rochester, MN (US); Eric John Nelson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/563,975

(22) Filed: May 3, 2000

(51) Int. Cl.
*H04Q 7/20* (2006.01)

(52) U.S. Cl. .............. 455/456.1; 455/186.1; 455/154.1; 455/457; 701/210

(58) Field of Classification Search .. 455/456.1–456.6, 455/457, 66.1, 414.1–414.4, 186.1, 154.1, 455/158.4, 158.5, 456, 66; 701/1, 210; 340/995.13, 340/995.21, 795.12
See application file for complete search history.

(56) References Cited

U.S. PATENT DOCUMENTS

| | | | | |
|---|---|---|---|---|
| 4,534,061 | A | * | 8/1985 | Ulug .......................... 455/17 |
| 4,535,335 | A | * | 8/1985 | Tagami et al. .............. 701/217 |
| 5,003,306 | A | * | 3/1991 | Takahashi et al. .......... 701/217 |
| 5,908,464 | A | * | 6/1999 | Kishigami et al. .......... 701/208 |
| 5,963,130 | A | * | 10/1999 | Schlager et al. ............ 340/540 |
| 5,991,690 | A | * | 11/1999 | Murphy ...................... 701/211 |
| 6,067,501 | A | * | 5/2000 | Vieweg ....................... 701/209 |
| 6,112,064 | A | * | 8/2000 | Arrowsmith et al. .... 455/186.1 |
| 6,188,878 | B1 | * | 2/2001 | Iwashita et al. ......... 455/158.4 |
| 6,292,747 | B1 | * | 9/2001 | Amro et al. ................ 701/213 |
| 6,518,889 | B1 | * | 2/2003 | Schlager et al. ......... 340/573.1 |
| 6,526,284 | B1 | * | 2/2003 | Sharp et al. ............. 455/456.1 |
| 6,614,363 | B1 | * | 9/2003 | Behr et al. ............. 340/995.19 |
| 6,665,533 | B1 | * | 12/2003 | Sakoda ...................... 455/414.2 |
| 6,694,253 | B1 | * | 2/2004 | Schroeder .................. 701/210 |
| 6,711,474 | B1 | * | 3/2004 | Treyz et al. .............. 455/456.1 |
| 6,834,195 | B1 | * | 12/2004 | Brandenberg et al. ... 455/456.3 |
| 6,992,619 | B1 | * | 1/2006 | Harrison .................. 455/186.1 |
| 2004/0119612 | A1 | * | 6/2004 | Chen ..................... 340/995.13 |
| 2004/0198389 | A1 | * | 10/2004 | Alcock et al. ........... 455/456.1 |

\* cited by examiner

*Primary Examiner*—Lana Le
(74) *Attorney, Agent, or Firm*—Roy W. Truelson (57) ABSTRACT

An apparatus, program product, and method selectively display or render display information from display information packets provided in a digital radio broadcast or via another form of packet-based communication medium based upon local information associated with the display, and typically irrespective of whether any of such packets are specifically addressed to any local receiver associated with a display.

The local information used in the selective display of display information may be a physical location of a user, whereby a location sensor is utilized to determine a current location that is compared to a location criterion provided in a data packet to determine whether the current location matches the location criterion. In addition to, or in lieu of location information, the local information may include local configuration data that identifies certain information types (e.g., categories of display information such as advertisements, traffic information, weather information, news information, sports information, etc.) that are enabled for display on a particular display.

22 Claims, 3 Drawing Sheets

SELECTIVE DISPLAY OF DISPLAY INFORMATION PACKETS IN A PACKET-BASED COMMUNICATION MEDIUM

FIELD OF THE INVENTION

The invention is generally related to reception of packet-based data, e.g., from a packet-based communication medium such as a digital radio broadcast, and in particular, to the reception and display of information embedded within display information packets communicated by such media.

BACKGROUND OF THE INVENTION

Wireless data transmission has significantly advanced since the days of analog AM and FM radio. For example, radio broadcasts are now capable of being broadcast in a digital format, typically using a packet-based communication medium, and often providing better sound quality than with older analog technologies.

With a packet-based communication medium, information is transmitted in distinct "packets", each typically with a header containing information about the contents of the packet, as well as the contents of the packet itself. In the case of digital radio broadcast, most packets include digitized audio data that, when received, is converted back to an analog format, amplified and output to loudspeakers.

Given the packet-based nature of a digital radio broadcast, additional information can be transmitted along with the broadcast, so long as the packets containing such information identify the type of information being transmitted in the packets. For example, in some digital radio broadcasts, station call letters are periodically sent to identify the radio station generating the broadcast. Other information capable of being displayed to a listener (herein referred to as "display information"), such as song or program titles, the current time, etc., may also be transmitted. A suitable digital radio receiver incorporating a visual display can then decode packets incorporating such display information and display the information on the visual display.

Given that practically any information can be transmitted in a digital format, a packet-based communication medium opens the possibility for the transmission of a wide variety of digital data along with a radio broadcast. For example, traffic and weather information, as well as emergency information, may be useful for many radio listeners, particularly those using mobile radio receivers mounted in automobiles and other vehicles. Even stationary radio receivers such as found in a home or business may benefit from the display of additional display information, e.g., emergency weather bulletins and the like. Moreover, from the perspective of a broadcaster, it may also be desirable to transmit visual advertisements to listeners to provide an additional source of revenue for the broadcaster.

A desirable goal for any radio broadcaster (particularly a commercial radio broadcaster) is to increase its overall audience, and certainly providing useful display information along with radio broadcasts could be perceived as a valuable add-on that attracts new listeners and/or keeps current listeners. However, it is highly unlikely that all listeners of a radio broadcast would find the same information to be interesting or useful. If a listener of a particular radio broadcast received a large volume of uninteresting or irrelevant information, that user would likely have greater difficulty in weeding out useful information, and might become less enamored with the radio broadcast. Consequently, any attempts to increase an audience by incorporating additional types of information that are potentially interesting to a wider variety of listeners would likely be subject to diminishing returns if the additional information was found to alienate a significant number of existing listeners.

In addition, digital radio broadcasts and like communications may be sent to listeners over a relatively wide geographical area. Some display information transmitted in such a broadcast may only be relevant to only a specific region within the broadcast area. As such, increases in the amount of such information in a radio broadcast may unduly burden listeners as they attempt to pick out the information that is relevant to their particular listening location. Picking out relevant display information based on a listener's location is comparable to listening to spoken traffic reports that have been provided for many years by some radio stations, since typically only a small portion of a traffic report (e.g., one road among many) may be relevant to any particular listener.

It is believed that were individual listeners able to manage or otherwise control the types of information presented to them from a digital radio broadcast, such listeners would be more likely to listen to the broadcast, thus having the potential of increasing a broadcaster's audience. A substantial need therefore exists in the art for an improved manner of managing the display of display information provided in a digital radio broadcast or other form of packet-based communication medium.

SUMMARY OF THE INVENTION

The invention addresses these and other problems associated with the prior art by providing an apparatus, program product, and method in which the display information from display information packets provided in a digital radio broadcast or via another form of packet-based communication medium is selectively displayed on a display based upon local information associated with the display, thereby effectively customizing the display of information on the display. Typically, such customization is irrespective of whether any of such packets are specifically addressed to any local receiver associated with the display, thereby providing a significant benefit in broadcast environments where packets are sent to multiple users.

Consistent with one aspect of the invention, the local information used in the selective display of display information is physical location, e.g., of a receiver, display, user, etc. Specifically, a location sensor is utilized to determine a current location. The current location is then compared to a location criterion provided in a data packet from a packet-based communication medium to determine whether the current location matches the location criterion. If so, display information provided in the data packet is selectively displayed on the display.

Consistent with another aspect of the invention, the local information used in the selective display of display information is local configuration data that identifies certain information types (e.g., categories of display information) that are enabled for display on an associated display. Specifically, display option data is stored in a memory to indicate whether display of display information associated with at least a portion of a plurality of information types is enabled for an associated display. Such data is then compared to a type identifier provided in a data packet received from a digital radio broadcast that identifies at least one of the plurality of information types to determine whether the display of display information associated with the information type identified by the type identifier is enabled for the display. If so, display information provided in the data packet is selectively displayed on the display.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The illustrated embodiments generally operate by selectively displaying display information embedded in display information packets communicated over a packet-based communication medium. A display information packet may be considered to include any type of packet that includes information suitable for display on a visual display, including textual information, graphical or image information, video or animation information, etc. In addition, a display information packet may, in some implementations, incorporate audio information in lieu of or in addition to visual information. In many implementations, such as digital radio broadcasts, a display information packet includes information that is secondary to another type of information that is the primary data being transmitted over a communication medium (e.g., audio data in the case of a digital radio broadcast). However, in other implementations, display information may be a primary type of information being broadcast over a communication medium.

Two principal mechanisms for selecting which display information packets are rendered are used in the illustrated implementation. However, as will become more apparent below, each mechanism may be used independently of the other in some applications.

First, display information packets may incorporate, in addition to display information, location and/or directional information that defines a location criterion used to provide location-based information display. For such display information packets, a current location of the listener, typically defined by the location of the receiver and/or display, is compared with the location criteria defined by such packets, so that only receivers/displays matching the location criteria will render such display information packets.

Second, display information packets may incorporate, in addition to display information, type information that identifies one or more of a plurality of information types that categorize the possible categories of display information transmitted over a particular packet-based communication medium. Local display option data associated with a particular display is then used to selectively enable or disable certain types of display information, so that only desired types of display information will be displayed. For digital radio broadcasts, for example, display information may be categorized into various categories such as advertisements, traffic information, sports information, weather information, news information, stock information, game information, etc., or any combination of the same. Other categories of information may be relevant to other applications.

When used alone or in combination, the above-described mechanisms permit a wider variety of information to be transmitted over a packet-based communication medium, yet permit individual receivers of such information to in effect customize that actual information that is displayed for such receivers. As such, in a digital radio application, for example, the goal of serving the widest possible audience, yet ensuring that individual listeners are able to receive information that they find to be interesting and useful, is greatly facilitated.

The discussion hereinafter will focus on a specific implementation of the invention in the field of digital radio broadcasting, where display information packets are transmitted within a digital radio broadcast and received by a suitable digital radio receiver having a display capable of displaying the display information transmitted within such packets. However, it will be appreciated by one of ordinary skill in the art having the benefit of the instant disclosure that certain aspects of the invention will have applicability in other applications that rely on packet-based communication, whether wired or wireless, based on radio broadcast technology, based on Internet technology, based on television broadcast technology, based on cellular technology, etc. Although the invention is not limited to use with broadcast-type technologies (where packets are not specifically addressed to any particular user), it will be appreciated that the certain aspects of the invention may find benefit in non-broadcast (i.e., addressed) technologies as well. Thus, the invention is not limited to the specific implementations discussed herein.

Figure 1:
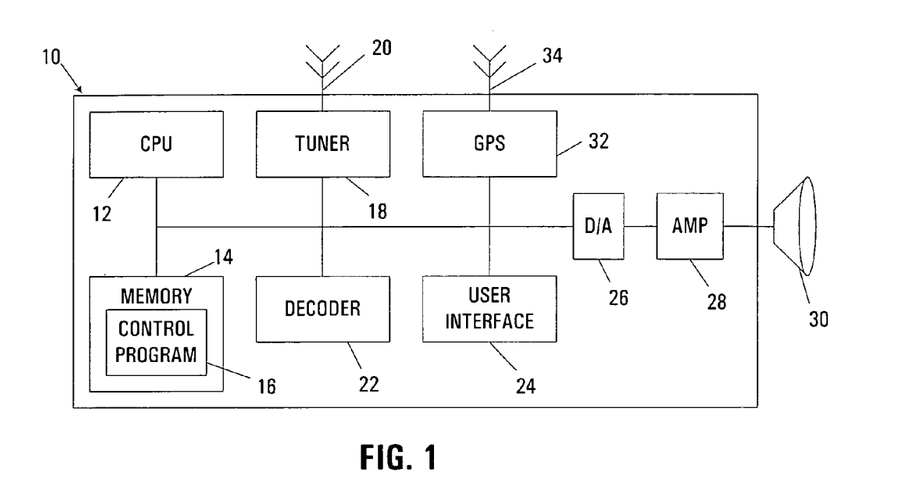
FIG. 1 is a block diagram of a digital radio receiver consistent with the invention.

Turning now to the Drawings, wherein like numbers denote like parts throughout the several views, FIG. 1 illustrates a specific implementation of the invention in a digital radio receiver 10, e.g., suitable for use in a mobile application (as with a car stereo) or a stationary application (as with a home stereo). Receiver 10 includes a central processing unit (CPU) 12 interfaced with a memory 14, within which resides a control program 16 that is executed by the CPU to implement the functionality described herein, as well as other functionality of a digital radio receiver as is known in the art.

Receiver 10 may be implemented using practically any type of computer, computer system or other programmable electronic device. The CPU 12 thereof may include one or more processors (e.g., microprocessors or microcontrollers), and the memory may represent volatile or non-volatile solid state memories, magnetic storage media, optical storage media, or combinations of the same, as well as any supplemental levels of memory, e.g., cache memories, backup memories (e.g., programmable or flash memories), read-only memories, etc. In addition, the memory may be considered to include memory storage physically located elsewhere in a digital processing system, e.g., any cache memory in a processor, as well as any storage capacity used as a virtual memory, e.g., as stored on a mass storage device or on another device coupled over a network interconnection.

Receiver 10 typically operates under the control of an operating system, and executes various computer software applications, components, programs, objects, modules, etc. (e.g., control program 16, among others). Moreover, various applications, components, programs, objects, modules, etc. may also execute on one or more processors in another computer or other device coupled to such receiver via networked interconnections, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs". The computer programs typically comprise instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

Over-the-air digital packets are received by a tuner 18 coupled to an antenna 20, and are decoded by a decoder 22. Interaction with a user is supported via a user interface 24, which may include both a display panel for displaying information to a user as well as one or more buttons for receiving input from a user. Audio data packets decoded by decoder 22 are converted into an analog format by a digital-to-analog (D/A) converter 26, with the analog output of converter 26 fed to an amplifier 28 that drives one or more loudspeakers 30. It will be appreciated that the reception and decoding of digital data packets, the generation and emission of an audible signal based upon the information within such packets, and the interaction with a user are all well understood functions implemented by digital radio receivers.

Location information is provided to receiver 10 by a location sensor, e.g., a Global Positioning System (GPS) receiver 32 coupled to a separate antenna 34. Any number of known location sensing technologies may be used in the alternative, including other radio-based sensors physically located in proximity to receiver 10, as well as remote sensors that transmit location information directly to the receiver. In addition to direct detection of location, other information may be used to detect location, e.g., determining the location of the receiver based on the location of a cell tower with which a cellular communications device coupled to the receiver is in communication. In addition, the location sensor (or another component such as a separate electronic compass) may be used to provide directional information indicating a direction of movement for the receiver (particularly for use in mobile applications). Directional information may also be derived from the location information by tracking location readings at different points of time, rather than directly determining the direction of the receiver. In other implementations, directional information may not be used.

Figure 2:
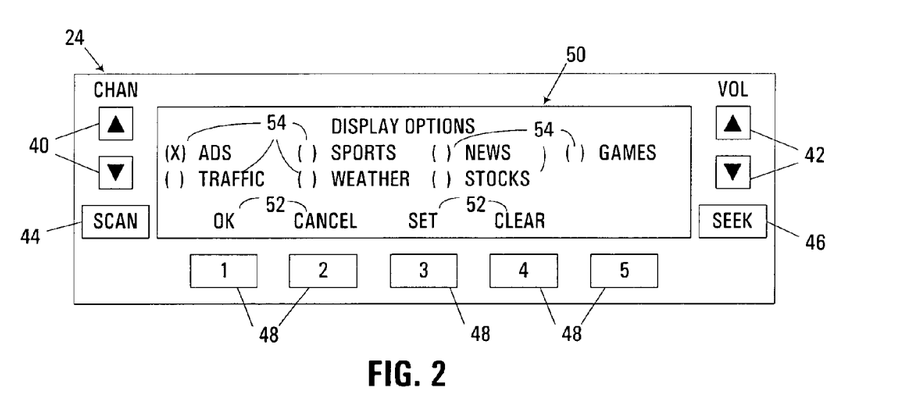
FIG. 2 illustrates an exemplary display panel for the digital radio receiver of FIG. 1, with a display options screen displayed thereon.

FIG. 2 illustrates an exemplary user interface 24, e.g., as may be utilized in a mobile radio receiver for use in cars, trucks and other vehicles. User interface 24 is implemented specifically as a face plate control panel including a plurality of buttons 40–48 for use in receiving user input and a display 50 capable of displaying information (including display information transmitted via a digital radio broadcast) to a user. User interface 24 includes a number of conventional radio buttons, including tuning buttons 40, volume buttons 42, scan button 44, seek button 46 and channel select buttons 48, the use and configuration of which are well known in the art.

In the illustrated implementation, the channel select buttons 48 are also utilized as soft-keys to access various menu options displayed on display 50. The current soft-key functions assigned to these buttons are represented by labels 52 displayed in proximity with the associated buttons 48. As will become more apparent below, the functions represented by labels 52 enable a user to select among various display options as represented at 54 on a display options screen displayed on the display 50.

Display 50 may be implemented using any of a number of known display technologies, including, for example, LCD, LED, etc. Moreover, it will be appreciated that a wide variety of alternate user interfaces may be used in the alternative. For example, display 50 may incorporate a touch screen to permit direct user input to the display. In other applications, alternate computer or other electronic device interfaces may be used, including keyboards, pointing devices, video displays, etc., as appropriate for the particular type of application within which the receiver is being used. The invention is therefore not limited to the particular user interface disclosed herein.

Figure 3:
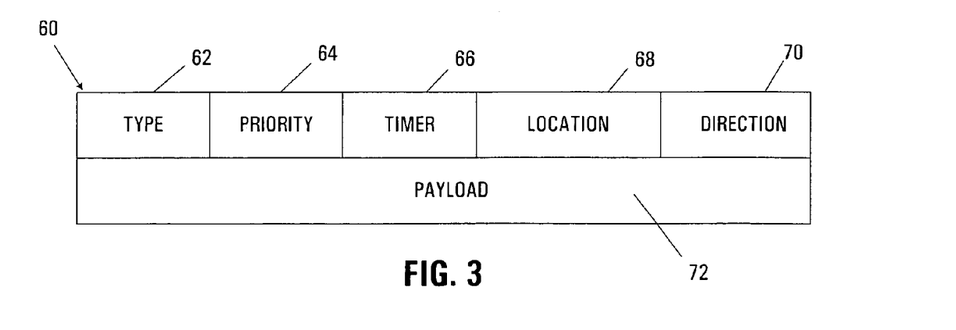
FIG. 3 is a block diagram of a display information packet capable of being received by the digital radio receiver of FIG. 1.

FIG. 3 next illustrates an exemplary format for a display information packet 60 consistent with the invention. As with a number of different packet formats, packet 60 includes header information including a plurality of fields 62–70, along with a payload field 72 storing the contents of the packet, which in the case of a display information packet includes information to be displayed on display 50 of receiver 10. As discussed above, the display information transmitted in payload field 72 may include textual, graphical, video, audio, and other forms of information for presentation to a listener on receiver 10.

The header information for packet 60 includes a type field 62 that specifies one or more of a plurality of information types used to categorize the display information contained in packet 60. In the illustrated implementation, for example, field 60 identifies one of a plurality of types of display information, namely: advertisements, traffic information, sports information, weather information, news information, stock information, and games. Type field 62 may also identify different types of packets in general, e.g., having a separate type for the audio data packets representing the primary digital radio broadcast. Additional header information may also be provided in packet 60 to distinguish display information packets from other types of packets received in the broadcast, as well as to provide other routing and other information as required by the communication protocol utilized by the broadcast.

Priority field 64 is utilized to provide a priority indication of the display information represented in packet 60. The use of a priority scheme (which is optional) would enable a broadcaster to assign different types of priorities to different information, so that more important information may be presented over information that is not of as great a concern. For example, priority field 64 may permit emergency or traffic information to be prioritized relative to other types of information, thus replacing any existing information display when a higher priority packet is received. Advertisement information may also be prioritized in such a manner. In the alternative, the different information types may be assigned different priorities, such that priority information is inherently contained within the information type associated with each packet.

Timer field 66 identifies a length of time to display the information included in packet 60. The data within field 60 may be used, for example, to initiate a timer upon display of the information, whereby the information will be removed upon expiration of the timer. In other embodiments, no time field may be provided, with display information displayed until it is replaced by other information received subsequent to the packet.

Location field 68 and direction field 70 together define a location criterion that typically specifies one or more regions within which the particular display information in the packet should be displayed. Different manners of identifying a region for a location criterion may be used consistent with the invention. For example, a region may be defined by a point in space (e.g., via latitude and longitude coordinates) in combination with an optional distance parameter, such that a region is defined within a fixed perimeter from a single point in space. A default distance parameter may also be used whenever only a single point in space is specified.

In the alternative, a region may be defined via its boundaries to, in effect, define a more complex perimeter for the region. A region may also be defined by defining distance parameters in latitudinal or longitudinal distances, i.e., to define a region as being +/−X kilometers longitudinally and +/−Y kilometers latitudinally from a specific point. A distance parameter may be consistent regardless of direction to provide an essentially circular region, or different distance parameters may be provided in different directions to provide non-circular regions.

Furthermore, rather than providing a location criterion that defines a region where display information should be displayed, a location criterion may specify one or more regions where display information should not be displayed, such that the absence of a matching region in the location criterion indicates that the display information should be displayed.

Moreover, directional information from field 70 may optionally be used to further define a region, e.g., so that receivers located within a particular region and traveling in a certain direction will be considered to be meeting the location criterion. Reliance on directional information would therefore permit, for example, traffic information relevant to an accident at a particular location on a roadway to be displayed only by receivers traveling toward the accident, and omitting receivers that are already traveling away from the accident. In other embodiments, however, direction field 70 may be omitted.

Payload field 72 stores the actual display information to be displayed. As such, the field may incorporate any data format suitable for the type of information being conveyed, e.g., an ASCII string for a text message, or other formats for other textual, graphical, audio, video or animation information.

Now returning to FIG. 1, as discussed above receiver 10 is under the control of a control program 16 that handles the display of information on the display, the interaction with a user, the tuning of the receiver to receive digital broadcasts from selected channels, the playback of a digital radio broadcast, and other necessary radio functions. A significant amount of this functionality, e.g., in controlling the reception and playback of digital audio broadcast, controlling volume, selecting channels, saving preset channels, etc. is well known in the art, and thus will not be discussed further herein. However, to provide a better understanding of the illustrated embodiment, additional functionality implemented in the control program to implement the management and display of display information packets in the manner discussed herein is specifically illustrated in FIGS. 4 and 5.

In the illustrated implementation, the control program is implemented as a multi-threaded event-driven system. Other programming models may be used in the alternative.

Figure 4:
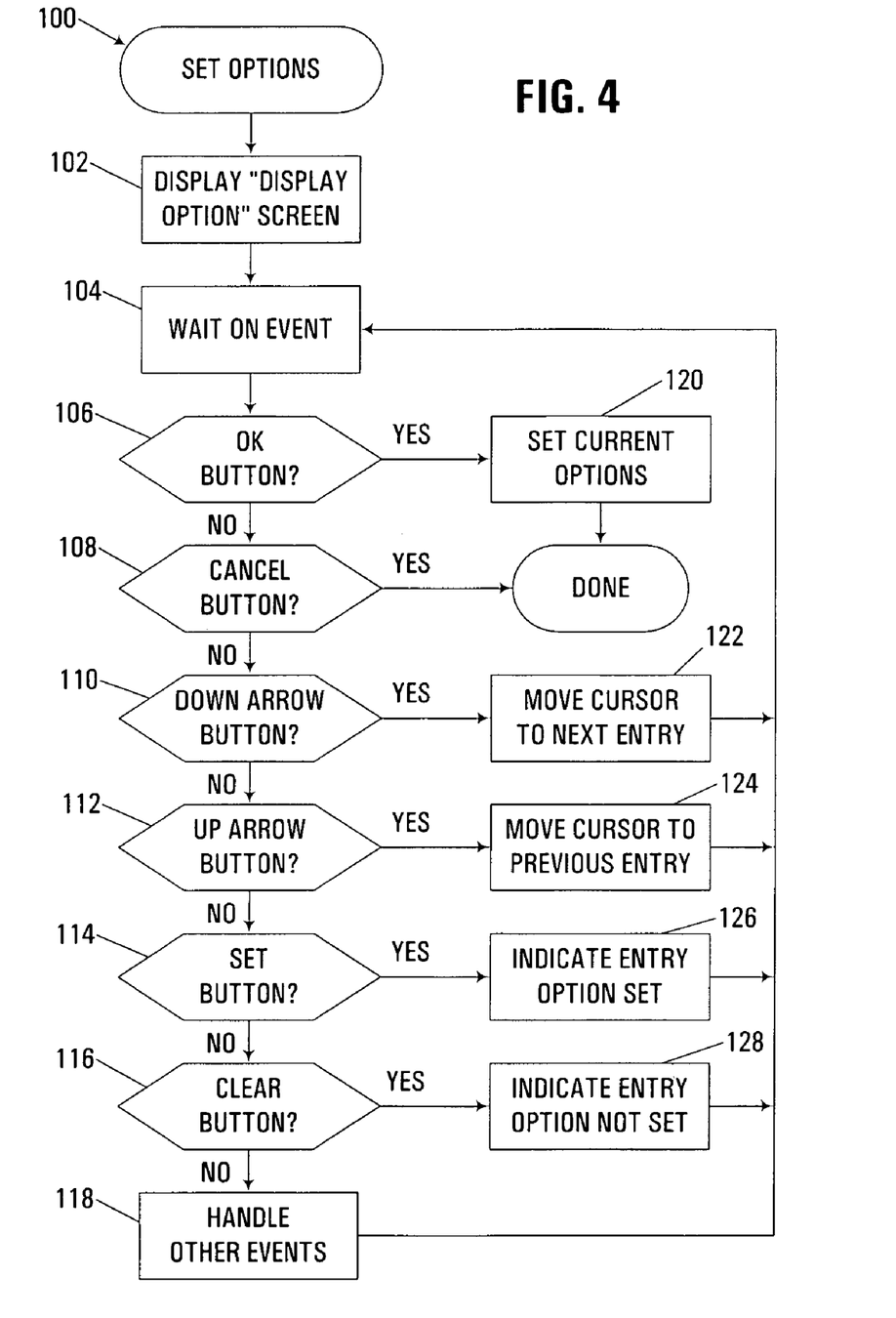
FIG. 4 is a flowchart illustrating the program flow of a set options routine executed by the digital radio receiver of FIG. 1.

FIG. 4 illustrates a set options routine 100 executed by the control program to set the display options for receiver 10. Routine 100 may be initiated, for example, in response to selection of an appropriate soft-key function accessible through the menu system in user interface 24.

Routine 100 begins in block 102 by displaying a display options screen, e.g., having the format shown on display 50 in FIG. 2. The exemplary display options screen includes a list of supported information types 54 and a plurality of soft-key functions, identified by labels 52 and initiated through selection of associated buttons 48, through which a listener can select or deselect various information types to be displayed on the receiver. A cursor (not shown) is typically moved between the various-information type entries 54, with individual entries selected (e.g., as represented by the "(X)" designation on the advertisement entry) or unselected (e.g., as represented by the "( )" designation on the other entries) through appropriate user input.

Returning to FIG. 4, once the display options screen is displayed, control passes to block 104 to wait on events. Several events, which are relevant to the configuration of the display options, are detected in blocks 106–116. Additional events, which are not relevant to configuring the display options, are handled in a conventional manner in block 118.

One event detected by routine 100 is depression of an "OK" button, which is detected in block 106 and handled in block 120 by setting the current options to match the currently-selected entries on the display options screen. Put another way, depression of the "OK" button confirms the selected entries on the display screen and stores these selections as display option data in the memory of the receiver for recall to determine whether certain types of information are displayed on the user interface. Once the current options are set in block 120, routine 100 is terminated. A user also has the ability to exit the display options screen without changing the current options. This is performed by depression of a "CANCEL" button, which is detected in block 108 and handled by terminating the routine without execution of block 120.

Selection of the entries on the display options screen is performed by scrolling a cursor through the display using up and down arrow buttons, which may be either the tuning or volume buttons 40, 42 shown in FIG. 2. As shown in FIG. 4, depression of a down arrow button is detected in block 110 and handled in block 122 by moving the cursor to the next entry on the display options screen. Likewise, depression of an up arrow button is detected in block 112 and handled by moving the cursor to a previous entry in block 124. Setting, or enabling, display of a particular information type is handled by depression of a set button, which is detected in block 114 and handled in block 126 by indicating on the display options screen that the option associated with the current is set. The converse operation, that of clearing or disabling a particular information type, is handled by depression of a "CLEAR" button, which is detected in block 116 and handled in block 128 by indicating on the display options screen that the option associated with the current entry is not set.

Through the interface described above, a user is capable of scrolling through the display options screen, and setting and clearing selected entries to select the types of information that the user would like to view with the receiver. Once a user has selected the desired information, the user depresses the "OK" button to confirm the selections, whereby the display option data stored in the memory is updated.

Figure 5:
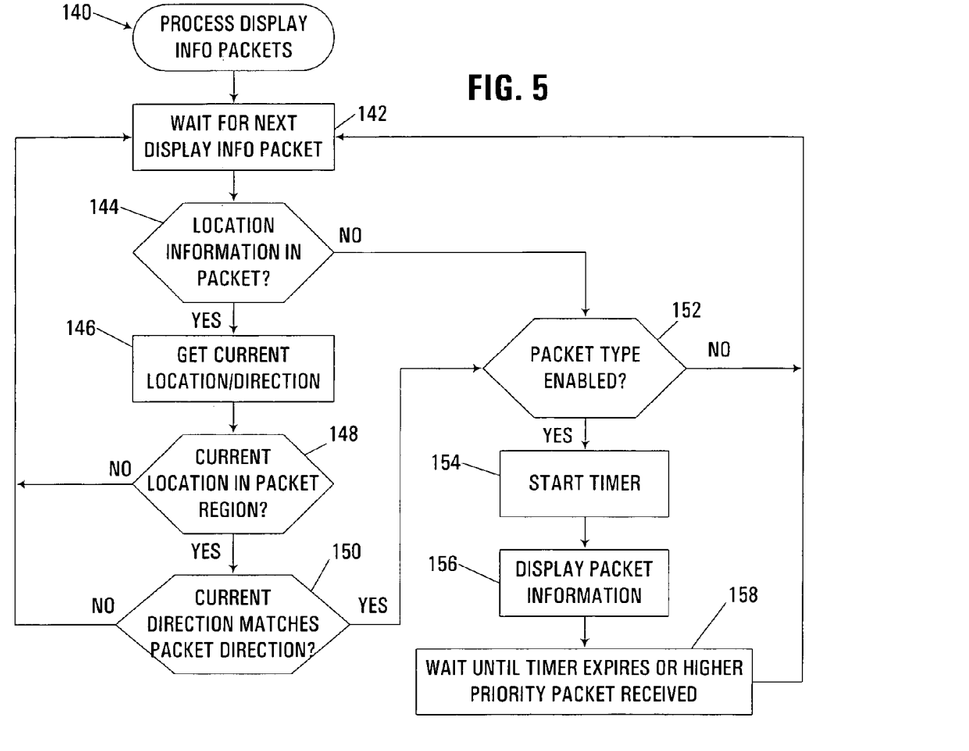
FIG. 5 is a flowchart illustrating the program flow of a process display information packets routine executed by the digital radio receiver of FIG. 1.

FIG. 5 next illustrates the operations that occur in processing and displaying display information provided in display information packets received via the digital radio broadcast. Routine 140 may be executed, for example, as a separate thread that received targeted events whenever a display information packet is detected. The functionality of routine 140 may also be incorporated into an overall packet processing routine, with a separate execution path utilized to handle non-display information packets (e.g., audio packets comprising the primary radio broadcast data).

Routine 140 begins in block 142 by waiting for a next display information packet to be received. Upon receipt of such a packet, control passes to block 144 to determine whether location information is stored in the packet.

If so, control passes to block 146 to get the current location and direction for the receiver, typically using the location sensor and a historical log of location points to determine a current direction for the receiver. Control then passes to block 148 to determine whether the current location is within the region specified in the display information packet. As discussed above, any number of mechanisms may be utilized to determine whether a current location for a receiver falls within a particular region associated with a packet. For example, a determination as simple as whether a distance between a single location stored in the packet and a current location of the receiver is less than a predetermined threshold may be used.

If the current location is not in the packet region, control returns to block 142 to wait for a next display information packet, effectively discarding the current packet. If the current location is within the packet region, however, control passes to block 150 to determine whether the current direction matches the direction information stored in the packet.

Typically, determining the direction of the receiver incorporates determining a history of movement of the receiver, e.g., by comparing the current location with one or more previous locations to determine a vector of movement, rather than considering the current direction that a receiver is facing. However, in other implementations, the direction that the receiver faces (e.g., as determined by a compass) may be considered in lieu of or in addition to the historical movement of the receiver. Determining whether the current direction matches that of the packet typically assumes a predefined range of matching directions, e.g., +/−X degrees from the direction identified in the packet. In some implementations, the range of matching directions may be specifically provided in the packet direction information.

If the current direction does not match the packet direction, control returns to block 142 to wait for the next display information packet, and thus, discard the current packet. If, however, the current direction does match the packet direction, control passes to block 152 to determine whether the packet type is enabled by the current display option data, e.g., by analyzing the packet type field for the packet. If not, control returns to block 142, and the packet is discarded. If the packet type is enabled, however, control passes to block 154 to start a display timer using the timer information stored in the packet. Next, block 156 displays the display information stored in the packet on the display. Control then passes to block 158 to wait until the timer expires or until a higher priority packet is received, whereby control then returns to block 142 to process subsequent display information packets.

Returning to block 144, if location information is not stored in a packet, it is determined that the packet is non-location specific, so control passes directly to block 152 to determine whether the packet type is enabled. Thus, for non-location specific packets, only the display option data is used to determine whether the display information associated therewith will be displayed on the display panel.

It may be seen that blocks 148 and 150 essentially test the location criterion stored in the packet versus the current location and direction of the receiver. Any of the above-described alternatives, e.g., the omission of direction information, alternate manners of specifying a location criterion, etc., may be utilized to implement this functionality in routine 140. Moreover, block 158 may be implemented in a number of manners, e.g., by executing the timer in a separate thread that issues an interrupt upon expiration, and also enabling a separate thread to detect the priority of various packets received and to issue an interrupt when a higher priority packet is received. Block 158 may also check for depression of a button on the user interface (e.g., the scan button, or another soft-key) to dismiss the current display information and scroll to the display information in a subsequent packet.

It will be appreciated that implementation of the functionality of either of routines 100 or 140 in specific program code would be well within the ability of one of ordinary skill in the art having the benefit of the instant disclosure.

Figure 6:
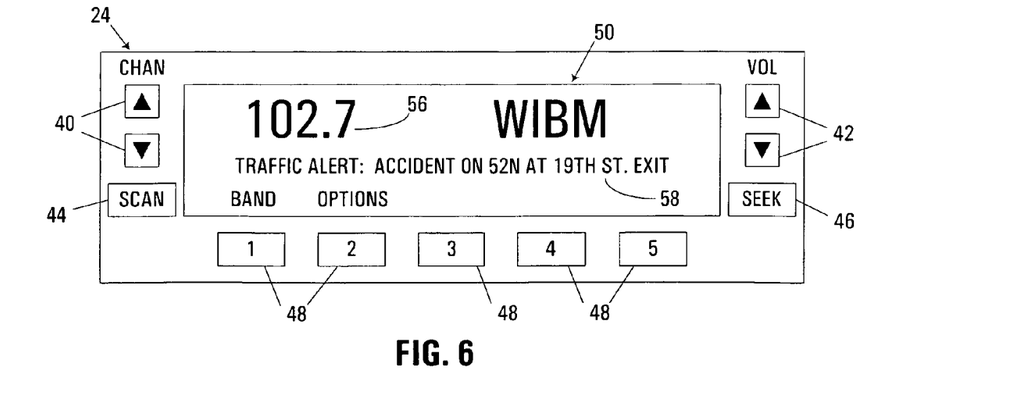
FIG. 6 illustrates the display panel of FIG. 2, with exemplary display information displayed thereon.

FIG. 6 next illustrates an exemplary display of display information on display panel 50 of user interface 24. As shown in the figure, conventional information, such as the current channel, may be displayed as illustrated at 56. In addition, display information from a display information packet may be displayed at 58, so long as the location criterion for the display packet is met and the information type (here, traffic) is enabled for the receiver.

Various modifications may be made to the illustrated embodiments without departing from the spirit and scope of the invention. For example, additional indicators including visual and/or audio indicators may be utilized to notify a user of a pending message. In addition, a user may be required to scroll through display information as it is received, or otherwise depress a button to receive a display message. A user may also be permitted to preliminarily dismiss a display message through depression of a button. Furthermore, in some implementations certain types of information (e.g., advertisements and/or emergency messages) may not be capable of being de-selected by users. In addition, no timer may be utilized in some applications so that received display information is displayed until additional information is received.

Selective display of display information in the manner discussed herein provides a number of unique advantages over conventional implementations. For example, permitting users to customize the types of information that they receive permits a broadcaster to serve a wider audience without inundating individual listeners with too much irrelevant information. In addition, with respect to location-based selection of display information, the information received by individual users may effectively be targeted to specific listeners of interest without having to specifically address packets to such listeners. As such, for traffic reports, such a capability would permit listeners traveling on certain roads to be informed of traffic problems that are relevant to those listeners. In addition, from the advertising perspective, such capability would permit unique advertising opportunities for both broadcasters and advertisers alike, e.g., advising listeners traveling on a certain road that a particular restaurant, store or gas station that they were about to pass was offering a special promotion that might be of interest to those listeners.

Other advantages and modifications will be apparent to one of ordinary skill in the art. Therefore, the invention lies in the claims hereinafter appended.

What is claimed is:

1. An apparatus, comprising:
(a) a location sensor configured to determine a current location;
(b) a receiver configured to receive data packets from a packet-based communication medium, at least one data packet received by the receiver including display information and a location criterion, the location criterion defining at least one of a geographic region and a direction, and the display information including non-traffic information to be displayed;
(c) a display; and
(d) a program configured to receive the current location from the location sensor and the display information and location criterion from the receiver, the program further configured to determine whether the current location matches the location criterion, and if so to display the display information on the display, wherein the packet-based communication medium comprises a digital radio broadcast;
wherein the data packet further includes a type identifier that identifies at least one of a plurality of information types, wherein the apparatus further comprises a memory configured to store display option data that indicates whether display of display information associated with at least a portion of the plurality of information types is enabled for the display, wherein the program is further configured to display the display information only if the display of display information associated with an information type identified by the type identifier is enabled for the display.

2. The apparatus of claim 1, wherein the location sensor comprises a Global Positioning System (GPS) receiver.

3. The apparatus of claim 1, wherein the packet-based communication medium comprises a broadcast medium.

4. The apparatus of claim 3, wherein the receiver comprises a digital radio tuner.

5. The apparatus of claim 4, wherein the receiver comprises a mobile digital radio.

6. The apparatus of claim 4, wherein the display information is selected from the group consisting of advertisement information, sports information, weather information, news information, stock information, game information, and combinations thereof.

7. The apparatus of claim 6, wherein the display information includes advertisement information.

8. The apparatus of claim 1, wherein the location criterion defines at least one geographic region, and wherein the program is configured to determine whether the current location matches the location criterion by determining whether the current location is within the defined geographic region.

9. The apparatus of claim 1, wherein the location criterion defines a direction, and wherein the program is configured to determine whether the current location matches the location criterion further by determining whether a current direction of movement matches the direction defined by the location criterion.

10. The method of claim 1, wherein the display information is selected from the group consisting of advertisement information, sports information, weather information, news information, stock information, game information, and combinations thereof.

11. The method of claim 10, wherein the display information includes advertisement information.

12. An apparatus, comprising:
(a) a location sensor configured to determine a current location;
(b) a receiver configured to receive data packets from a packet-based communication medium, at least one data packet received by the receiver including display information and a location criterion, the location criterion defining at least one of a geographic region and a direction, and the display information including non-traffic information to be displayed;
(c) a display; and
a program configured to receive the current location from the location sensor and the display information and location criterion from the receiver, the program further configured to determine whether the current location matches the location criterion, and if so to display the display information on the display, wherein the packet-based communication medium comprises a digital radio broadcast;
wherein the data packet further includes a priority field and a timer field, wherein the program is configured to display the display information for the data packet until either expiration of a time period identified in the timer field or reception of another data packet having a higher priority than that identified in the priority field.

13. A method of displaying display information received over a packet-based communication medium on a display, wherein the packet-based communication medium comprises a digital radio broadcast, the method comprising:
(a) receiving a data packet from the packet-based communication medium that includes display information and a location criterion, the location criterion defining at least one of a geographic region and a direction, and the display information including non-traffic information to be displayed;
(b) determining a current location;
(c) determining whether the current location matches the location criterion; and
(d) if so, displaying the display information on the display;
wherein the data packet further includes a type identifier that identifies at least one of a plurality of information types, wherein the method further comprises accessing a memory to retrieve display option data that indicates whether display of display information associated with at least a portion of the plurality of information types is enabled for the display, the method further comprising determining whether the display of display information associated with an information type identified by the type identifier is enabled for the display.

14. The method of claim 13, wherein determining the current location includes accessing a Global Positioning System (GPS) receiver.

15. The method of claim 13, wherein the location criterion defines at least one geographic region, and wherein determining whether the current location matches the location criterion includes determining whether the current location is within the defined geographic region.

16. The method of claim 13, wherein the location criterion further defines a direction, and wherein determining whether the current location matches the location criterion further includes determining whether a current direction of movement matches the direction defined by the location criterion.

17. An apparatus, comprising:
(a) a digital radio receiver configured to receive data packets from a packet-based digital radio broadcast, at least one data packet received by the digital radio receiver including display information and a type identifier that identifies at least one of a plurality of information types;
(b) a display;
(c) a memory configured to store display option data that indicates whether display of display information associated with at least a portion of the plurality of information types is enabled for the display;
(d) a program configured to receive the display information and type identifier from the digital radio receiver and the display option data from the memory, the program further configured to determine whether display of display information associated with an information type identified by the type identifier is enabled for the display, and if so, to display the display information on the display; and
(e) a location sensor configured to determine a current location, wherein the data packet further includes a location criterion, and wherein the program is further configured to display the display information on the display only if the current location matches the location criterion.

18. The apparatus of claim 17, wherein each of the plurality of information types is selected from the group consisting of advertisement information, traffic information, sports information, weather information, news information, stock information, game information, and combinations thereof.

19. A method of displaying display information received in a packet-based digital radio broadcast on a display, the method comprising:
(a) receiving a data packet from the packet-based digital radio broadcast that includes display information and a type identifier that identifies at least one of a plurality of information types;
(b) accessing a memory to retrieve display option data that indicates whether display of display information associated with at least a portion of the plurality of information types is enabled for the display;
(c) determining whether display of display information associated with an information type identified by the type identifier is enabled for the display; and
(d) if so, displaying the display information on the display;

wherein the data packet further includes a location criterion, the method further comprising determining a current location and determining whether the current location matches the location criterion.

20. A program product, comprising:
(a) a program configured to receive display information, a location criterion, and a type identifier from a data packet transmitted in a packet-based digital radio broadcast, the type identifier identifying at least one of a plurality of information types, the program further configured to receive display option data from a memory that indicates whether display of display information associated with at least a portion of the plurality of information types is enabled for a display, to determine whether display of display information associated with an information type identified by the type identifier is enabled for the display, and if so, to display the display information on the display, to determine a current location, and to determine whether the current location matches the location criterion; and
(b) a signal bearing medium bearing the program.

21. An apparatus, comprising:
(a) a location sensor configured to determine a current location;
(b) a receiver configured to receive data packets from a packet-based communication medium, at least one data packet received by the receiver including display information and a location criterion;
(c) a display; and
(d) a program configured to receive the current location from the location sensor and the display information and location criterion from the receiver, the program further configured to determine whether the current location matches the location criterion, and if so to display the display information on the display;

wherein the data packet further includes a type identifier that identifies at least one of a plurality of information types, and wherein the program is further configured to display the display information only if the display of display information associated with an information type identified by the type identifier is enabled for the display;
wherein the apparatus further comprises a memory configured to store display option data that indicates whether display of display information associated with at least a portion of the plurality of information types is enabled for the display.

22. A method of displaying display information received over a packet-based communication medium on a display, the method comprising:
(a) receiving a data packet from the packet-based communication medium that includes display information and a location criterion;
(b) determining a current location;
(c) determining whether the current location matches the location criterion; and
(d) if so, displaying the display information on the display;

wherein the data packet further includes a type identifier that identifies at least one of a plurality of information types, the method further comprising determining whether the display of display information associated with an information type identified by the type identifier is enabled for the display;
wherein the method further comprises accessing a memory to retrieve display option data that indicates whether display of display information associated with at least a portion of the plurality of information types is enabled for the display.

* * * * *